Aug. 16, 1938.                E. J. COOK                2,127,161
                         ENGRAVING APPARATUS
                        Filed Feb. 19, 1934          2 Sheets-Sheet 1

INVENTOR
Everett J. Cook
BY
ATTORNEYS

Aug. 16, 1938.  E. J. COOK  2,127,161
ENGRAVING APPARATUS
Filed Feb. 19, 1934  2 Sheets-Sheet 2

INVENTOR
Everett J. Cook

BY
ATTORNEYS

Patented Aug. 16, 1938

2,127,161

UNITED STATES PATENT OFFICE 2,127,161

ENGRAVING APPARATUS

Everett J. Cook, Toledo, Ohio, assignor, by mesne assignments, to H. H. Buggie & Company, Toledo, Ohio, a corporation of Ohio Application February 19, 1934, Serial No. 712,087

8 Claims. (Cl. 178—6.6)

The invention relates to engraving apparatus of that type having a light sensitive cell for controlling the operation of the engraving tool or cutter. Some of the objects of the invention are to provide an improved machine for cutting a design in an article in accordance with a pattern; to provide an improved engraving apparatus comprising a cutter and means which is controlled by the light sensitive cell for moving the cutter in a manner such that the error in movement of the cutter is reduced to the minimum; to provide an engraving apparatus comprising a cutter and an electromagnet having a movable armature connected to the cutter to move the latter through a distance which is relatively small as compared to the distance through which the armature moves; and to provide means for normally maintaining the unit comprising the light sensitive cell and the unit comprising the engraving apparatus at predetermined distances from the pattern and the article respectively.

Other objects are to provide an apparatus constructed to cut designs in articles of various shapes; to so construct the apparatus that it will automatically cut designs which cannot now be commercially cut; and to provide improved means for supporting the articles.

These and other objects of the invention will become more fully apparent from the following description and claims, taken in connection with the accompanying drawings, in which Figure 1 is a diagrammatic view of an engraving apparatus showing an embodiment of my invention;

Figure 1:
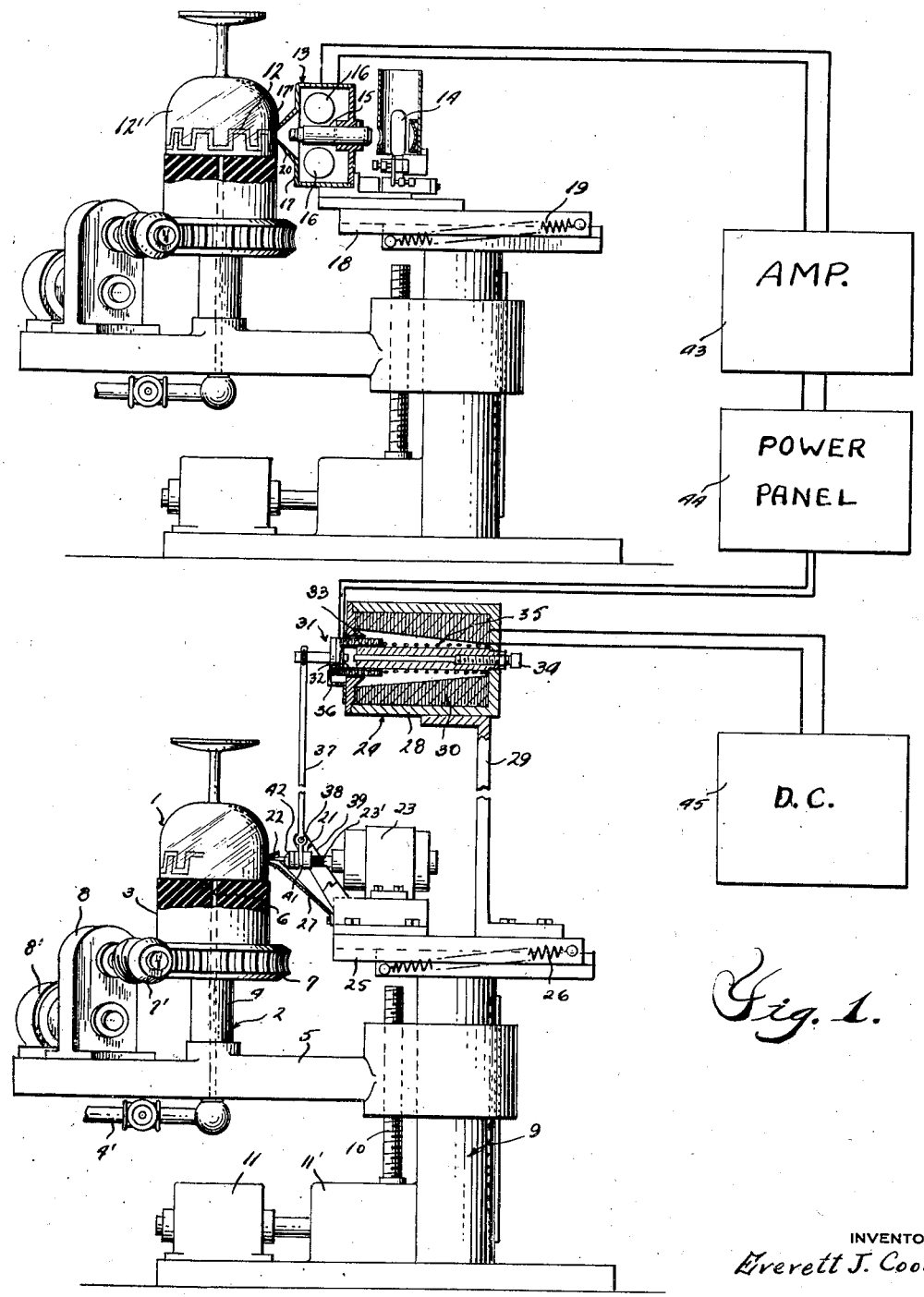

In general, the engraving apparatus is constructed so that it is adapted to operate on articles of a number of various shapes. Such articles may have flat or planar surfaces or cylindrical surfaces, or may have other surfaces, which in the present instance are designated warped surfaces. In any event, the design produced by the apparatus is controlled by the intensity of predetermined shading of a pattern. The pattern is scanned by a unit which comprises a light beam projector and a light sensitive cell which is controlled by the reflection of the light from the pattern. The article is engraved by an engraving apparatus or cutting unit comprising a cutter, a motor for driving the cutter and means controlled by the light sensitive cell for moving the cutter inwardly or outwardly relative to the article. The means for moving the cutter comprises a movable member which is connected to the cutter in such a manner that the error in movement of the cutter is reduced to the minimum. The scanning unit and the engraving apparatus or cutting unit are maintained at predetermined distances from the pattern and the article respectively to also assist in more accurately cutting the design. The apparatus is particularly adapted for use in cutting designs in hollow-ware, such as glassware, although it is apparent that the apparatus may also be readily used in other fields.

As illustrated in the present instance, the article 1 is hollow-ware in the nature of a drinking glass upon the surface of which a design is to be cut. This article is mounted upon the support 2 which comprises the base member 3, the hollow spindle 4 carrying the base member and the arm 5 in which the spindle is journaled. The base member 3 is adapted to have sealing engagement with the edge of the article 1 and is preferably formed of rubber for this purpose. The base member is provided with the passageway 6 extending centrally thereof and communicating with the interior of the article and with the passageway through the spindle, the latter passageway in turn communicating with the pipe 4' which is adapted to be connected to a suitable pump. The arrangement is such that the air may be withdrawn from the article so that the atmospheric pressure will firmly hold the article upon the base member. The base member 3 is adapted to be slowly rotated by means of the worm wheel 7 which is connected to the spindle 4 and which meshes with the worm 7'. This worm is preferably driven through suitable reduction gearing 8 from the electric motor 8', both of which are carried by the arm 5. For moving the support for the article 1, the arm 5 is mounted upon the standard 9 of the apparatus to slide in a direction parallel to the axis of the article. This arm is threadedly engaged by the screw 10 which is driven by the electric motor 11 through the reduction gearing 11'. The construction is such that the article is axially moved a very slight amount which, in the present instance, is approximately .003 of an inch for each revolution of the article.

12 is the pattern which is formed by predeterminedly shading the object 12' to govern the design to be cut in the surface of the article 1. While this object may be a model, it is preferably a glass object corresponding exactly in size and shape to the glass article. The surface of this object is predeterminedly shaded by painting the same, the intensity of the shading varying from black to white in accordance with the desired depth of the engraved design. The object 12' is mounted upon a support which is formed in exactly the same manner as the support 2 for the article 1. The object is driven and axially advanced simultaneously and at the same rates as the article and in the same manner.

13 is the scanning unit comprising the projector 14 and the lens barrel 15 for projecting a light beam of very small area upon the pattern 12. The scanning unit also comprises the light sensitive cells 16 which are controlled by the reflection of the light from the pattern. These light sensitive cells are enclosed by the house 17 and are at opposite sides of the lens barrel 15 which latter is mounted on the front wall of the house. The house is provided with the opening 17' in its rear wall for the passage of the light beam from the projector 14 to the pattern and also for the passage of the light reflected by the pattern to the light sensitive cells. The projector 14 and the cell house 17 are mounted upon the table 18 which is movable toward and away from the pattern. For normally urging the table toward the pattern, there is the tension coil spring 19 connected to the table and to the frame of the apparatus. The position of the table relative to the immediately adjacent portion of the pattern is controlled by the guide 20 which is carried by the cell house 17 and is engageable with the immediately adjacent surface of the object 12'. The guide 20 is tubular and concentric with the light beam from the projector 14 and the opening 17'. The size of the guide is such that the desired clearance is provided for the passage of the light reflected from the pattern to the light sensitive cells.

21 is the engraving apparatus or cutting unit which comprises the rotatable cutter 22 preferably having a conical cutting end, the electric motor 23 for driving this cutter and the electro-magnet 24 for moving the cutter inwardly or outwardly relative to the article 1. The electric motor and the electro-magnet are mounted upon the table 25 which is normally urged toward the article 1 by the coil spring 26 and the position of which relative to the immediately adjacent surface of this article is predetermined by the guide 27 upon the table 25. The guide 27 is tubular and encircles the cutter.

The electro-magnet comprises the housing 28 which is directly mounted upon the table 25 through the intermediary of the bracket 29. This housing encloses the field 30 which is in the nature of a wire coil. The electro-magnet also comprises the armature 31 which is a cylindrical body 32 preferably formed of aluminum and a wire coil 33 comprising relatively few turns of fine wire. The armature is axially reciprocable within the field 30 and its inward position is limited by the stop 34 which is formed of a rod adjustably secured to the front wall of the housing and extending axially within the housing and adapted to abut the armature. 35 is a coil spring encircling the stop 34 and abutting the rear end of the armature and the rear wall of the housing for normally urging the armature forwardly. The forward movement of this armature is limited by the stop 36 which, as shown, is a bracket secured to the front wall of the housing and engageable with the rear end of the armature.

For the purpose of reducing to the minimum the error in movement of the cutter inwardly and outwardly relative to the surface of the article 1, the electro-magnet is designed to provide for an appreciable axial movement of the armature, the stroke in the present instance being approximately one-half inch. Also this armature is operatively connected to the cutter to move the cutter to a distance which is relatively small as compared to the distance through which the armature moves. In the present instance, the stroke of the cutter is approximately .015 of an inch. It is apparent, however, that for certain classes of work the stroke of the cutter may be greater, but, in any event, it is relatively small as compared to the stroke of the armature. For moving the cutter from the armature, there is the lever 37 which is pivotally mounted intermediate its ends as at 38 upon the bracket 39 carried by the table 25. The upper end of this lever is pivotally connected to the rear end of the armature body 32, while the lower end of this lever is preferably bifurcated to embrace the collar 40 which is mounted upon and held from axial movement relative to the sleeve 41. This sleeve is longitudinally slidably mounted on and driven by the drive shaft 23' of the electric motor, the two being suitably keyed or splined to each other. The outer end of the sleeve carries the chuck 42 for securing the cutter in axial alignment with the drive shaft. The pivot 38 is positioned to secure the above relative movements.

For controlling the electro-magnet from the light sensitive cells, the latter are electrically connected through the amplifier 43 and the power panel 44 to the wire coil 33 of the armature. The amplifier is of conventional type and its output controls the power panel which is also of conventional type and the power tubes of which are operable for all strengths of current being supplied thereto. The field 30 is constantly energized during the operation of the apparatus by direct current represented as coming from the source 45.

Figure 3:
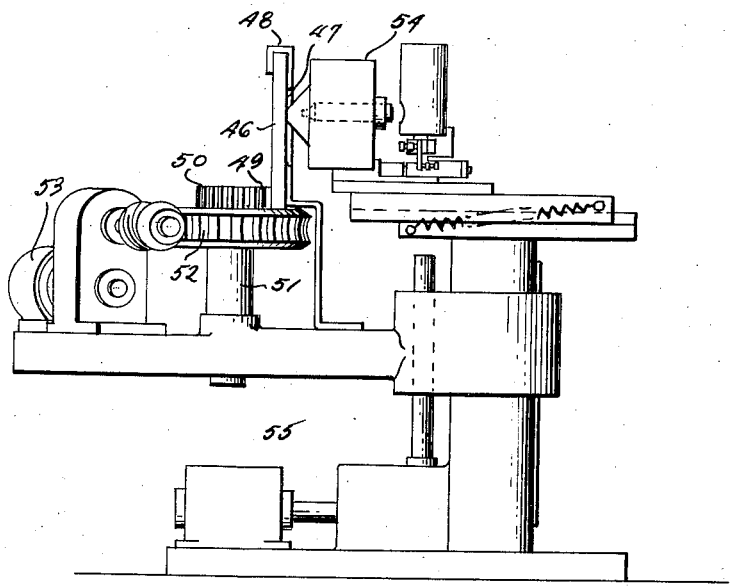
Figure 3 is a view similar to a portion of Figure 1 showing another embodiment of my invention.
Figure 4:
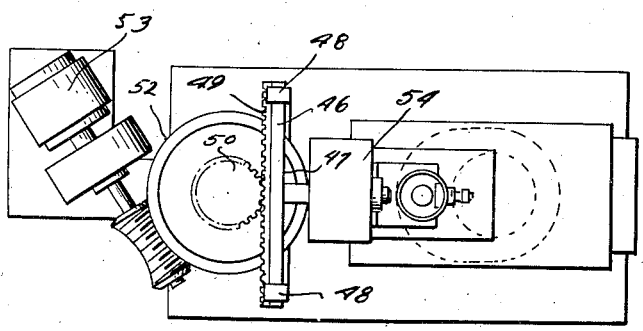
Figure 4 is a top plan view thereof.
Figure 2:
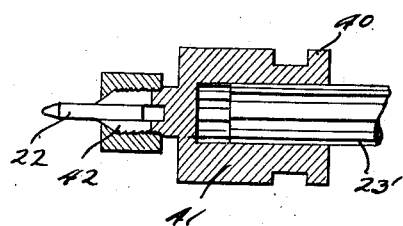
Figure 2 is a detail.

The engraving apparatus is also adapted to be used with a pattern arranged in one plane and this apparatus in general is very similar to that illustrated in Figure 1. However, it differs mainly in reciprocating the pattern and the article and also intermittently advancing the pattern and the article at the ends of their strokes. As shown in Figures 3 and 4, the object 46, which carries the pattern 47, instead of being mounted as illustrated in Figure 1, is so mounted that it can be reciprocated horizontally. The pattern is arranged in one plane and the object is a flat member extending vertically and suitably guided by the guides 48 which are mounted upon the arm carrying the mechanism for reciprocating the object. Extending longitudinally of the object at its lower edge is the rack 49 which meshes with the gear 50. This gear is secured to the spindle 51 above the worm wheel 52. This worm wheel is driven in the same manner as the corresponding worm wheel shown in Figure 1, but the electric motor 53 is reversible at predetermined intervals to effect the reciprocation of the object and the pattern past the scanning unit 54. This scanning unit and its mounting is the same as the corresponding parts in Figure 1. The electric motor 55 for raising the arm carrying the object, the pattern, and the means for reciprocating the same is operative only at the ends of the reciprocable strokes of the object and the pattern to successively advance the object and pattern through small increments. The remainder of the apparatus is the same as shown in Figure 1, but the electric motor for rotating the article is simultaneously reversed with the electric motor 53 and the electric motor for successively advancing the article through small increments is simultaneously driven with the electric motor 55. Furthermore, the motors of each set preferably operate at the same speeds.

What I claim as my invention is:

1. In a duplicating machine, a support for a pattern having a record thereon to be reproduced, a support for the work having a surface upon which the record is to be reproduced, a tool supported opposite the work for movement into and out of engagement with the work, a scanning unit for scanning the record on the surface of the pattern and comprising a light sensitive cell, a carrier for the scanning unit supported for movement toward and away from the pattern, means controlled by the light sensitive cell for moving the tool into and out of engagement with the work, spring means normally urging the carrier toward the pattern, and means mounted on said carrier and engageable with the surface of the pattern under the influence of said spring means for maintaining the scanning unit a predetermined distance from the pattern irrespective of irregularities in the surface contour of the pattern.

2. In a duplicating machine, a support for a pattern having a record thereon to be reproduced, a support for the work having a surface upon which the record is to be reproduced, a tool supported opposite the work for movement into and out of engagement with the latter, a carrier for the tool also movable toward and away from the work, a scanning unit for scanning the record on the surface of the pattern and comprising a light sensitive cell, a carrier for the scanning unit supported for movement toward and away from the pattern, means controlled by the light sensitive cell for moving the tool into and out of engagement with the work, spring means normally urging the carriers respectively toward the pattern and work, and means mounted on each carrier and respectively engageable with the surfaces of the work and pattern under the influence of said spring means for maintaining the scanning unit and tool carrier predetermined distances from the pattern and work irrespective of irregularities in the surface contours of the pattern and work.

3. In a duplicating machine, means supporting a pattern with one surface thereof extending in a general vertical direction and having a record on said surface to be reproduced on an article, a scanning unit comprising a source of illumination, means for directing a beam of light from the source of illumination on the surface of the pattern, a light sensitive cell controlled by light reflected from said surface, a tool movable into and out of engagement with the article on which the record is to be reproduced, means controlled by the light sensitive cell for operating the tool, means for normally urging the scanning unit in a direction toward the vertical surface of the pattern having the record thereon, and means responsive to variations in the surface contour of the pattern to maintain a uniform focal distance between the scanning unit and pattern irrespective of variations in the contour of said surface.

4. In a duplicating machine, means supporting a pattern with one surface thereof extending vertically and having a record on said surface, means supporting an article with the surface thereof on which the record is to be reproduced also extending generally vertical, a scanning unit positioned opposite the vertical surface of the pattern and comprising a source of illumination, means for directing a beam of light from the source of illumination on the vertical surface of the pattern, a light sensitive cell controlled by light reflected from the pattern surface, a tool movable into and out of engagement with the generally vertically extending surface on the article, a carrier for the tool also supported for movement toward and away from the article, means controlled by the light sensitive cell for operating the tool, means normally urging the scanning unit in a direction toward the generally vertically extending surface of the pattern, means normally urging the tool carrier in a direction toward the article, and means responsive to variations in the contours of the vertical surfaces of the pattern and article for adjusting the positions of the scanning unit and tool carrier relative to the pattern and article to maintain the scanning unit and tool predetermined distances from the vertical surfaces aforesaid irrespective of variations in the contours of said surfaces.

5. In an engraving apparatus, a unit for scanning the object which has the shape of the article to be engraved and is predeterminedly shaded to govern the design to be engraved on the article, said scanning unit comprising a light sensitive cell controlled by the intensity of the shading on the object, a unit for cutting the article comprising a tool and means for driving said tool, means controlled by the light sensitive cell for actuating said tool comprising a movable member and means operatively connecting the movable member and tool for moving the latter a distance which is relatively small as compared to the distance through which the movable member moves, means yieldingly urging the units toward the object and article, and means carried by each unit respectively engageable with the surfaces of the object and article under the influence of the last named means for maintaining said units predetermined distances from the object and article irrespective of variations in the surface contours of the object and article.

6. In an engraving apparatus, a unit for scanning the object which has the shape of the article to be engraved and is predeterminedly shaded to govern the design to be engraved on the article, said scanning unit comprising a light sensitive cell controlled by the intensity of the shading on the object, a unit for cutting the article, said cutting unit comprising a cutter and means for driving said cutter, means controlled by said cell for actuating said cutter, means carried by the units respectively engageable with the surfaces of the object and article, and means yieldingly urging the last named means and adjacent surfaces of the object and article into engagement for maintaining the units predetermined distances from the object and article irrespective of variations in the surface contours of the object and article.

7. In a machine for cutting a design in glassware, a unit for scanning the object which has the shape of the glassware and is predeterminedly shaded to govern the design, said scanning unit comprising a light sensitive cell controlled by the intensity of the shading of the object, a unit for cutting the glassware, said cutting unit comprising a cutter and means for driving said cutter, means controlled by said cell for actuating said cutter, means yieldingly urging the units in directions toward the glassware and object, means carried by the scanning unit and engageable with the object under the influence of the yieldable means for maintaining said scanning unit a predetermined distance from the portion of the object being immediately scanned, and additional means carried by the cutting unit and engageable with the surface of the glassware under the influence of the yieldable means for maintaining said cutting unit a predetermined distance from the portion of the glassware being immediately cut.

8. In a duplicating machine, a scanning unit for scanning a record on the surface of a pattern comprising a source of illumination, means for directing a beam of light from the source of illumination on the surface of the pattern, a light sensitive cell controlled by light reflected from the pattern surface, a tool movable into and out of engagement with an article on which the record is to be reproduced, means controlled by the light sensitive cell for operating the tool, means carried by the scanning unit and engageable with the surface of the pattern, and means yieldingly urging the last named means and surface of the pattern into engagement with each other for maintaining the focal distance between the scanning unit and pattern uniform irrespective of variations in the surface of the pattern.

EVERETT J. COOK.